United States Patent [19]

Jaime

[11] Patent Number: 5,522,639
[45] Date of Patent: Jun. 4, 1996

[54] INFANT CAR SEAT HAVING DUAL SUNVISORS

[75] Inventor: Orlando C. Jaime, Triangle, Va.

[73] Assignee: UV Art, Inc., Montclair, Va.

[21] Appl. No.: 177,378

[22] Filed: Jan. 5, 1994

[51] Int. Cl.⁶ .................................................... A47C 7/62
[52] U.S. Cl. ........................... 297/184.13; 297/183.3; 297/184.11
[58] Field of Search ............... 297/184.13, 184.14, 297/184.15, 184.17, 184.11, 184.1, 183.3, 183.2, 183.4, 256.1; 5/416, 418; 135/96, 97

[56] References Cited

U.S. PATENT DOCUMENTS

| | | | |
|---|---|---|---|
| 4,583,779 | 4/1986 | Myers | 297/184.13 |
| 4,761,032 | 8/1988 | Sanchez | 297/184.13 X |
| 5,143,419 | 9/1992 | Tepper | 297/183.3 |
| 5,188,380 | 2/1993 | Tucek | 297/184.17 X |
| 5,244,292 | 9/1993 | Wise | 297/183.3 X |

*Primary Examiner*—Laurie K. Cranmer
*Attorney, Agent, or Firm*—Marion P. Lelong

[57] ABSTRACT

An infant car seat has an adjustable carrying handle and foot and head sunvisors that can be elevated above the infant's feet and head while offering protection from sun, wind, and dust and enabling an adult to monitor the infant occupant without undue strain.

22 Claims, 8 Drawing Sheets

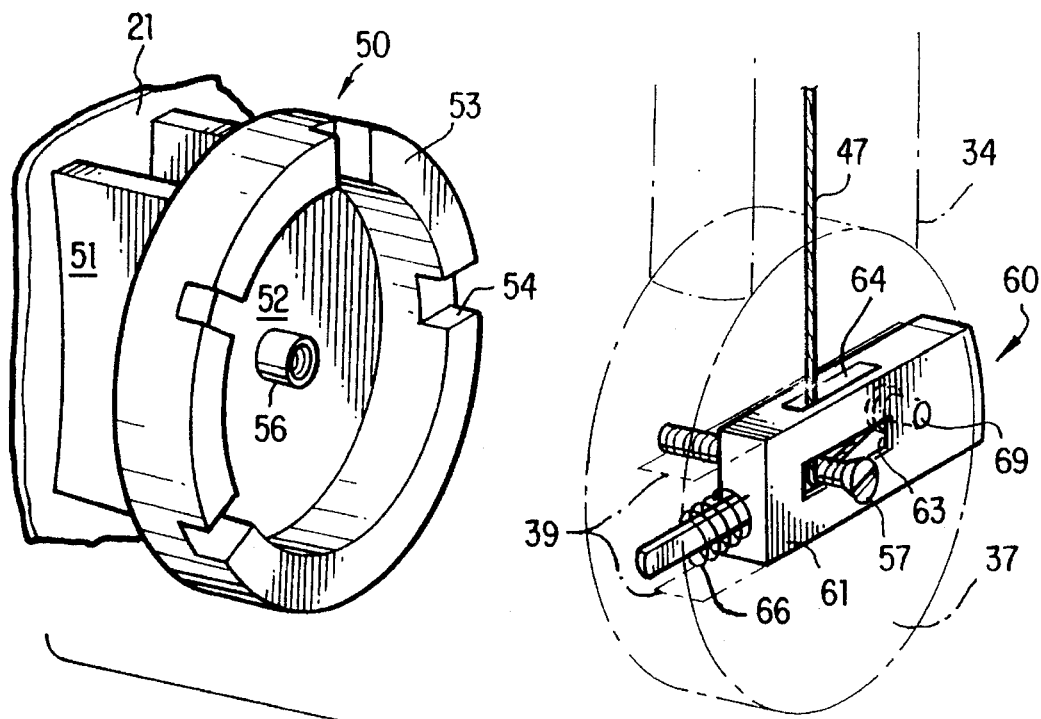
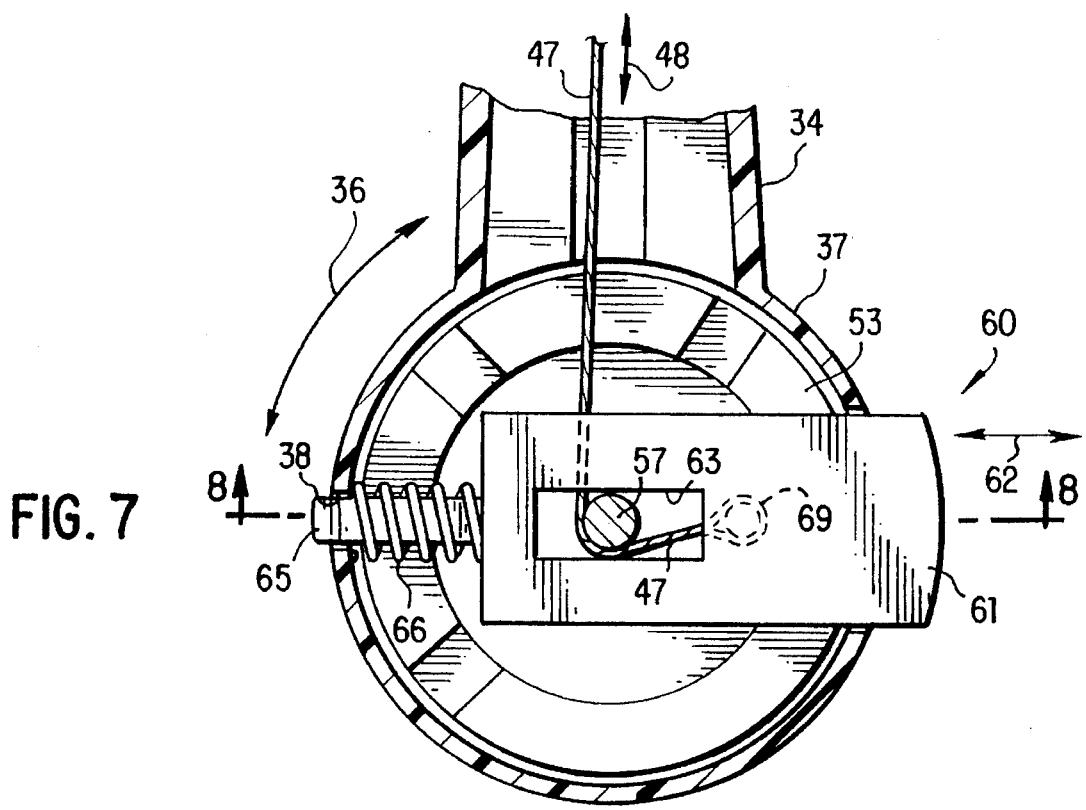
FIG. 6
FIG. 7

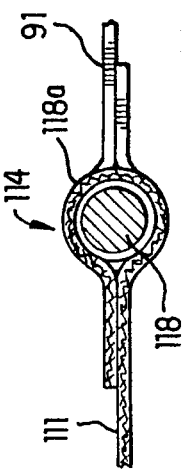
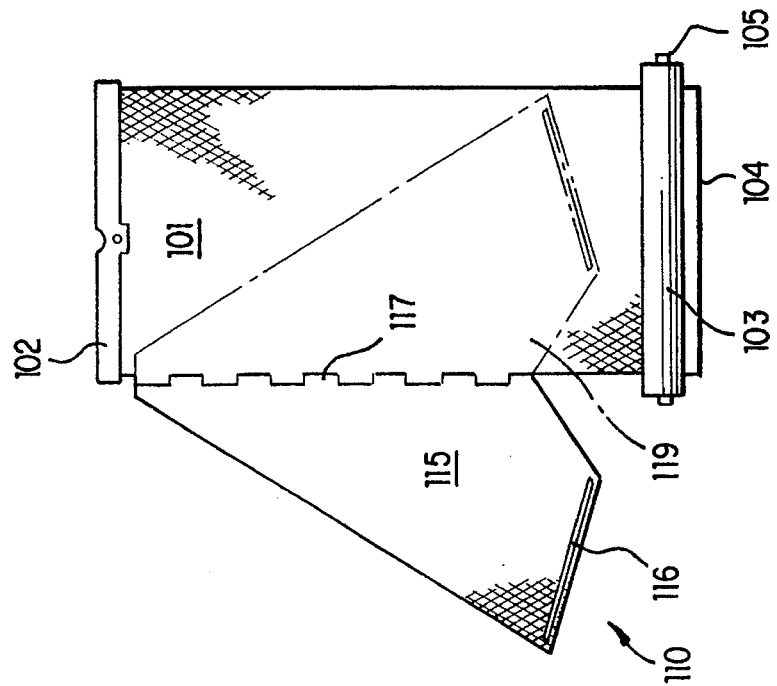
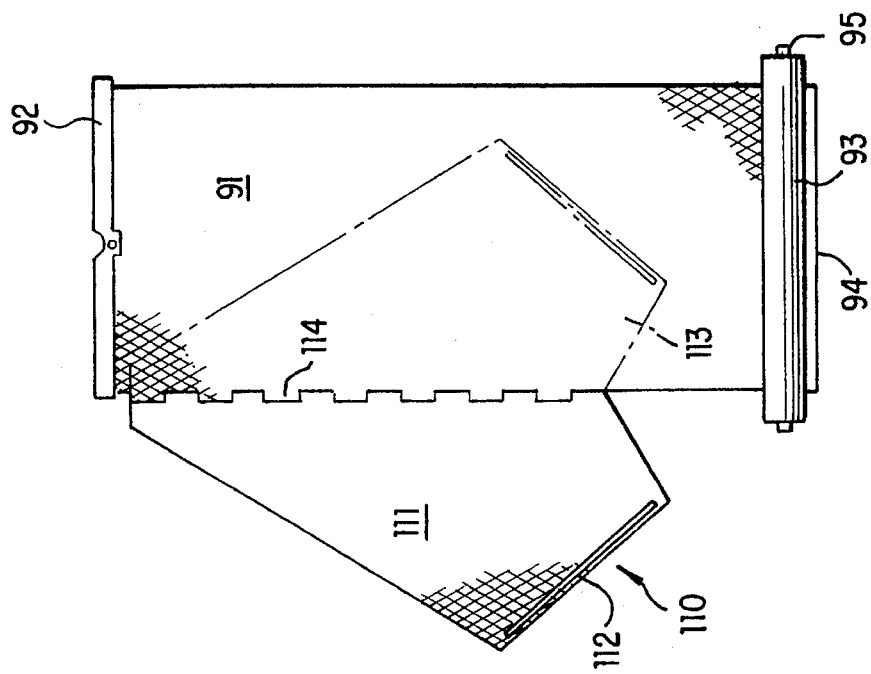

INFANT CAR SEAT HAVING DUAL SUNVISORS

BACKGROUND OF THE INVENTION

1. Field of the Invention

This invention relates to sunshades and impact protection devices for infants. It particularly relates to automobile seats for infants that include sunshades and handles for hand carrying of its occupant while outside of the automobile.

2. Review of the Prior Art

It is widely recognized that infants can not be safely transported within an automobile while held in an adult's arms because the acceleration and deceleration forces generated during emergency stops and during accidents are too great for even a very strong adult and cause the infant to be crushed between the adult's body and the dashboard of the automobile. Car seats providing comfort and security to infants and small children have consequently been made mandatory by state and federal laws.

Even though such seats do protect the child satisfactorily while the automobile is underway, they may offer little protection against strong sunlight, glare, and the like, thereby causing the small occupant much discomfort. Numerous car seat devices that include sunshades of some type have consequently been designed, but they are generally antiquated and ineffective.

In addition, such a car seat is often carried by its handle from an automobile to a building or to an outdoor place for recreation, such as a sandy beach. In such a situation, blowing sand can easily create not only discomfort but also a hazard for the small occupant thereof.

U.S. Pat. No. 1,339,527 shows a collapsible screen for baby carriages which has sideflaps and is rollably stored.

U.S. Pat. No. 1,412,935 shows a baby carriage screen as foot and head portions which are attached to the handle in the middle of the carriage.

U.S. Pat. No. 2,864,429 discloses a child's automobile seat which is provided with a sunshade or top member and side curtains on either or both sides of the seat. The seat is also adapted to be attached to a stroller or cart for use apart from the car.

U.S. Pat. No. 4,027,915 describes a sun shield assembly for detachable attachment to an infant's seat, comprising a pair of mounting brackets and a hood, which is mountable in the brackets, having a top wall and opposed side walls. The hood is made of a resilient material.

U.S. Pat. No. 4,579,385 relates to an inflatable cushioning device having a first end adapted for attachment to the infant car seat behind the infant's head and to a seat in front of the infant, including sideflaps extending sufficiently downward from the portion just above the infant's head to protect the infant from strong sunlight and excessive heat. The cushioning device is preferably formed of a flexible plastic material of a color sufficiently dark to absorb an appreciable portion of sunlight incident thereon, thereby protecting the child from exposure to sunlight and resultant discomfort from excessive heat.

U.S. Pat. No. 4,583,779 shows a sun shade and protective cushion device for use with a conventional automobile child seat. The sun shade comprises a flexible sheet-like canopy which is generally horizontal in use and has a pocket formed at a first end for fitting over the top of the back of the infant's car seat and a means at a second end, opposite to the first end, for stretchably anchoring the canopy to a part of the car's interior that is spaced apart from the infant's car seat. A pair of side flaps also may extend along opposite sides of the canopy and be either in a raised position, flat atop the canopy, or in a generally downwardly lowered position.

U.S. Pat. No. 4,634,175 describes a baby carrier that is usable as a chair, a rocker, or a one-handed carrier by means of a pair of pivots which rotatably connect its support handle to the sides of the carrier. The pair of pivots can be locked in various positions. The carrier also comprises a detachable fabric carrying pouch, preferably provided beneath the carrier between the rockers, for storing various items.

U.S. Pat. No. 4,637,447 describes a shading device comprising "a flexible shading blanket or curtain which is stored, when retracted, compactly rolled on a window shade type spring roller" for protection of thermally sensitive cargo aboard a NASA orbiter spacecraft.

U.S. Pat. No. 4,810,030 describes a shade for use with infants and children car seats and the like having a seat and back member that fits into the seat and accommodates strap restraints and a hood that attaches to the seat and back member to project as a canopy from a back portion of the seat and back member. The device has a two-part construction including a flexible seat and back with connection means for the hood and pass-through openings for seat restraints.

U.S. Pat. No. 5,007,674 relates to a sun shade for an infant which is of soft and flexible construction, self-supporting, and free of rigid structural components comprising a visor portion which is formed integrally with at least top portion and preferably also with upper portions of the side panels.

U.S. Pat. No. 5,067,770 discloses a sun shield for a child's car seat which "consists of a single flat piece of pre-cut firm bendable material having a roof segment, a pair of side visor segments, a pair of support flap segments and a back segment, with a cut out gap area between each support flap segment and the back segment." The bendable material is standard gauge corrugated cardboard.

U.S. Pat. No. 5,150,945 describes a removable cover for a vehicular safety seat for a child to prevent burning of the child by seat areas exposed to the sun.

U.S. Pat. No. 5,154,473 discloses a sun screen and windbreaker panel for a chair in which the panel is at the back of the chair and an overhead panel part is used as a sun shade. In its third embodiment, the panel is initially rolled up in the same manner as a window shade and pulled outwardly from a shaft to a predetermined length.

U.S. Pat. No. 5,168,889 describes a soft sun covering for a wheelchair which is removable and storable in a carrier case.

U.S. Pat. No. 5,188,380 is directed to a sunshade assembly which comprises a rear portion, a front portion, a canopy of a suitable flexible material, hubs, a rear bow, and a front bow.

U.S. Pat. No. 5,205,308 relates to an apparatus for protecting an infant in a forwardly facing infant's seat in a vehicle from direct exposure to sun rays. It comprises a frame and a foldable canopy carried by the frame to extend protectively above the seat and to be folded as the frame sections are relatively pivoted.

Although these prior art baby carriers provide several helpful features, there are additional problems that remain unsolved. These problems include monitoring of an infant occupant in the rear seat of an automobile by parents without visual strain, rapid and simple fastening of foot and head sunvisors, spacing of these sunvisors from the infant's body, simplified mounting and fastening of sideflaps to the sunvisors in order to protect the infant from wind, blowing sand, and sun, carrying the car seat and infant while it continues to furnish protection from both sunlight and the elements, and reliable operation of its handle at both grip and hub locations.

SUMMARY OF THE INVENTION

It is accordingly an object of this invention to provide an infant car seat having sunvisors made of UV protectant materials that are also sufficiently transparent for monitoring of an infant occupant by a parent or other adult without visual strain.

It is another object to provide an infant car seat having a handle that can be single-handedly changed in position.

It is a further object to provide an infant car seat that can be single-handedly carried by an adult, outside of the automobile, while the infant car seat continues to provide protection against sunlight and glare and additionally furnishes protection against blowing sand at a beach and against wind, rain, snow, and other manifestations of inclement weather.

It is an additional object to provide an infant car seat having sunvisors that can be stored unobtrusively and positioned while in use with finger-tip activity by an adult.

It is a still further object to provide an infant car seat having a means for simple and quick removal of the sunvisors when needed.

In accordance with these objects and the principles of this invention, an improved infant car seat is provided that protects its infant occupant from glare and strong sunlight while enabling a parent to monitor the infant without strain, that provides unobtrusive storage of its pair of sunvisors and associated sideflaps, that enables an adult to be able to position the sunvisors and sideflaps with little effort, that has a means for simple and quick removal of the sunvisor and sideflap assembly when needed, that has a means for finger-tip positioning of its handle for single-handed carrying of the car seat and its infant occupant, and that provides protection of the infant from blowing sand and the elements while being carried out of doors by an adult or while resting, for example, on a beach.

The handle may additionally be positioned to facilitate placing an infant within the car seat and for removing the infant therefrom. The handle may also be positioned to provide additional shock protection to the rearward-facing infant during a collision. Finally, the handle may be positioned to elevate the head end of the infant car seat in order to facilitate feeding of the infant and the like.

The infant car seat of this invention generally comprises an integrally molded infant carrier shell, an adjustable handle assembly which is movably attached to the shell, foot and head sunvisors which are readily mounted and easily removable, two pairs of side flaps which are hingedly or selectively attached to the sunvisors, and sunvisor elevation assemblies for both sunvisors that hold the sunvisors above the infant's feet and head. The infant car seat additionally comprises two handle release and positioning assemblies, one being adjacent to the handle grip and the other being a part of each circular handle hub so that the handle may be released and positioned at another of its four positions by means of a finger-tip motion at any of three places. The sunvisors are preferably made of vinyl polymers or a blend of Dacron$^R$ and Lycra$^R$ which are transparent but capable of blocking ultraviolet light. These materials are about one-fourth of a millimeter in thickness and have 50–100 holes per square inch; the holes are 0.75–1.00 mm in diameter.

The infant car seat of this invention specifically comprises:

A. an integrally molded infant carrier shell, comprising a bottom, a foot end, a head end, a pair of sides, a pair of cartridge compartments, and cushioning material;

B. a handle assembly, comprising:
1) an elongated handle member, which has opposed ends, is disposed in parallel to the bottom, and comprises a handle grip,
2) a handle grip release assembly, comprising a female slide member, a male slide member, a compression spring, a pair of flexible wires, and wire connections for attaching one end of each flexible wire to one of the slide members,
3) a pair of side members, each being rigidly attached at one end to one of the opposed ends of the handle member;

C. a handle pivoting assembly, comprising:
1) a pair of circular hubs, each being rigidly attached to the other ends of one of the side members, each hub having a positioning orifice, a pair of guide plates, and a slide opening,
2) an elongated key which is slideably disposed in each hub between the pair of guide plates and is aligned with the positioning orifice and with the slide opening, each key having a longitudinally and laterally aligned shaft slot, a longitudinally and vertically aligned wire slot, a rigidly attached stop peg, an axially aligned and rigidly attached positioning rod at one end of the slide, a positioning spring surrounding the rod, and a rigidly attached terminal connection for one of the flexible wires, the positioning rod being operably disposed within the positioning orifice and the key being operably disposed so that the other end thereof protrudes through the slide opening so as to be available for pushing with a finger to move the stop peg towards the center line of the carrier shell,
3) a pair of cups, each being rigidly attached to a side of the carrier shell and having a plurality of peg slots in the outer edge thereof and a rigidly attached shaft in the center thereof, one of the hubs being coaxially aligned with and surrounding one of the cups and the stop peg being selectively positioned within one of the peg slots;

D. a foot sunvisor assembly, comprising:
1) a cartridge which is stored within a compartment within the foot end,
2) a foot sunvisor having a tension edge, a pair of side edges, and a fixed edge which is attached to and stored within the cartridge, and
3) a pair of side flaps which are hingedly or selectively attached to the side edges;

E. a head sunvisor assembly, comprising:
1) a cartridge which is stored within a compartment within the head end,
2) a head sunvisor having a tension edge, a pair of side edges, and a fixed edge which is attached to and stored within the cartridge, and
3) a pair of side flaps which are hingedly or selectively attached to the side edges;

F. a foot sunvisor elevation assembly, comprising:
1) a U-shaped support bar which is pivotally attached at the ends thereof to a pair of shafts which are rigidly attached to the sides of the carrier shell at the foot end thereof, and 2) a pair of levers, each being rigidly attached to one end of the support bar, whereby the support bar is selectively raised to an elevated position or lowered to a depressed position, the foot sunvisor being supported above the feet of an infant occupant when the support bar is in the elevated position; and G. a head sunvisor elevation assembly, comprising:

1) a U-shaped support bar which is pivotally attached at the ends thereof to a pair of shafts which are rigidly attached to the sides of the carrier shell at the head end thereof, and 2) a pair of levers, each being rigidly attached to one end of the support bar, whereby the support bar is selectively raised to an elevated position or lowered to a depressed position, the head sunvisor being supported above the head of an infant occupant when the support bar is in the elevated position.

The upper edge of each foot sideflap is attached to one of the side edges of the foot sunvisor along a flexible hinge in the folding embodiment or by means of a Velcro® strip in the detached embodiment. The upper edge of each head sideflap is similarly attached to the side edges of the head sunvisor along a flexible hinge in the folding embodiment or by means of a Velcro® strip in the detached embodiment. The four sideflaps of the folding embodiment are folded inwardly upon the foot and head sunvisors and are rolled spoolwise with the sunvisors into the respective foot and head cartridges for storage. The four sideflaps of the detached embodiment are peeled from the foot and head sunvisors and are stored within a storage compartment, along with other infant gear, that is disposed at the head end. The lower edge of each sideflap, in both the folding and the detached embodiments, is provided with a Velcro® strip that is selectively attached to an interacting Velcro® strip along a side of the infant carrier shell.

The carrier shell has a shoulder harness slot in its bottom that is centrally disposed in approximately a crotch location for an infant and a pair of shoulder harness slots in its bottom that approximately straddle an infant occupant's shoulders. An insertion guide for a car seat belt is also disposed at the top edge of each side of the carrier shell as well as a pair of slots for the car seat belt with which it is normally secured. A handgrip is additionally molded into the shell at both the foot end and the head end.

The handle grip and attached side members contain internal guide and/or reinforcement plates for strengthening them. The flexible hinges are formed from alternating loops, attached to the sunvisors and to the sideflaps, within which flexible hinge pins are positioned for holding the loops in alignment. The sunvisors are held in protective position by engaging a centrally disposed hole in each tension edge over attachment hooks which are attached to the handle grip release assembly, being disposed perpendicularly to the handle member and centrally between the side members.

BRIEF DESCRIPTION OF THE DRAWINGS

FIG. 6 is an exploded isometric view of a handle positioning cup, a handle hub in phantom, and a slidable key for positioning the handle.

FIG. 7 is a front elevation view of a slidable key, a handle hub, and a small portion of a handle side member for the infant car seat.

FIG. 9 is a front view of the foot sunvisor cartridge, the foot sunvisor, and a foot sideflap in closed position and, in phantom, in storage position for the hinged embodiment.

FIG. 9A is a sectional view of the flexible hinge connecting the foot sunvisor and its sideflap.

FIG. 10 is a front view of the head sunvisor cartridge, the head sunvisor, and a head sideflap in closed position and, in phantom, in storage position for the hinged embodiment.

DESCRIPTION OF THE PREFERRED EMBODIMENT

Figure 1:
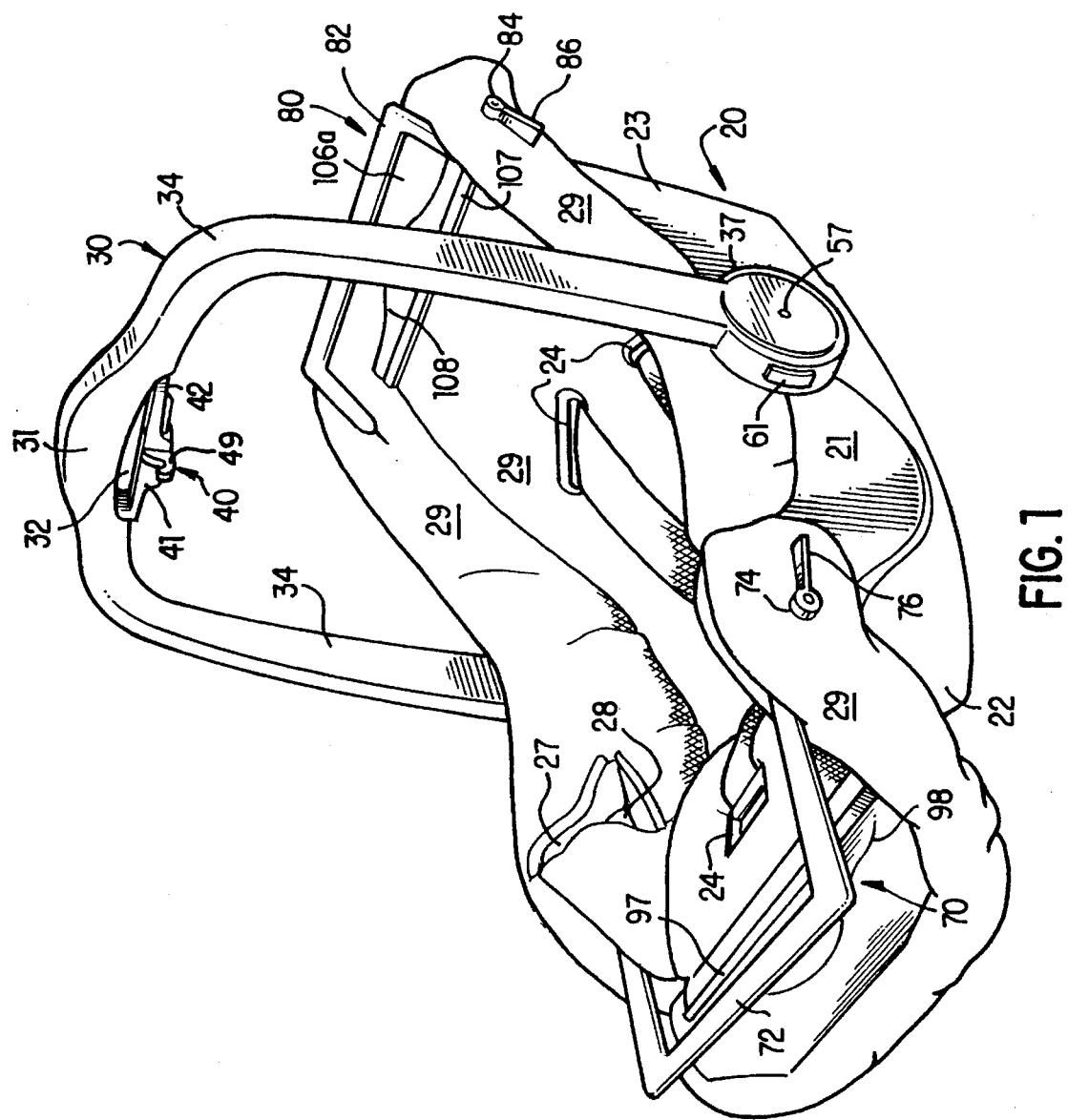
FIG. 1 is an isometric view of the infant car seat with both sunvisors removed.

As shown in FIGS. 1–11B of the drawings, the infant car seat of this invention comprises infant carrier shell 20, handle assembly 30, handle grip release assembly 40, positioning cups 50, slidable key assemblies 60, sunvisor elevation assembly at foot end 70, sunvisor elevation assembly at head end 80, foot sunvisor assembly 90, head sunvisor assembly 100, and sideflap assemblies 110.

Figure 5:
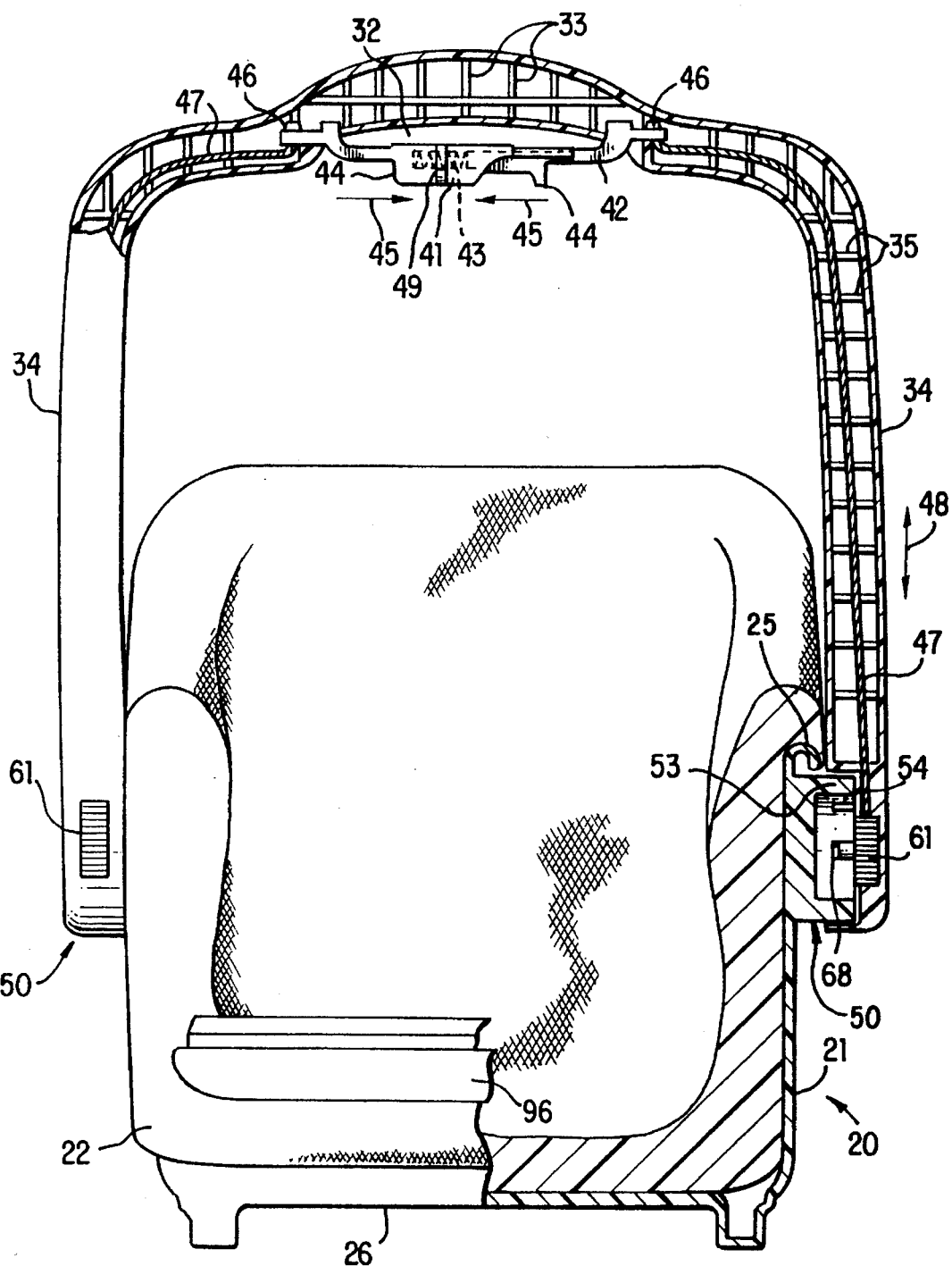
FIG. 5 is a partially sectioned front view of the midsection of the infant car seat, taken in the direction of the arrows 5—5 in FIG. 4.

A shown in FIGS. 1 and 5, infant carrier shell 20 comprises sides 21, foot end 22, head end 23, shoulder harness slots 24, top edges 25, shell bottom 26, insertion guide for car seat belt 27, car seat belt slot 28, and cushions 29. This infant car seat is designed for mounting in the front seat or in the rear seat of an automobile, with the infant facing to the rear.

As shown in FIGS. 1, 2, 4, 5, and 7, handle assembly 30 comprises elongated handle grip 31 which is parallel to bottom 26 and generally horizontal, handle release recess 32 below handle grip 31, reinforcement plates 33 within handle grip 31 which stiffen and strengthen it, side members 34 which are rigidly attached to the opposed ends of handle member 31, rectangular guide plates 35 within side members 34 which stiffen and strengthen the side members, circular hub 37 at the end of each side member 34, and positioning orifice 38 in each circular hub 37. Rectangular support plates 39 are attached to the inner sides of hub 37 and are disposed approximately perpendicularly to handle side members 34. As indicated in FIG. 7, side members 34 pivot back-and-forth along arc 36.

As shown in FIGS. 1 and 5, handle grip release assembly 40 comprises female slide member 41, male slide member 42, compression spring 43 within member 41, squeeze surfaces 44 on members 41 and 42 for squeeze movements 45, wire connections 46, and flexible wires 47 which are slideably disposed within side members 34. Wires 47 move reciprocally in release movement 48 within members 35, as indicated in FIGS. 5 and 7. Attachment hooks 49 are rigidly and perpendicularly attached to each side of female slide member 41.

Figure 8:
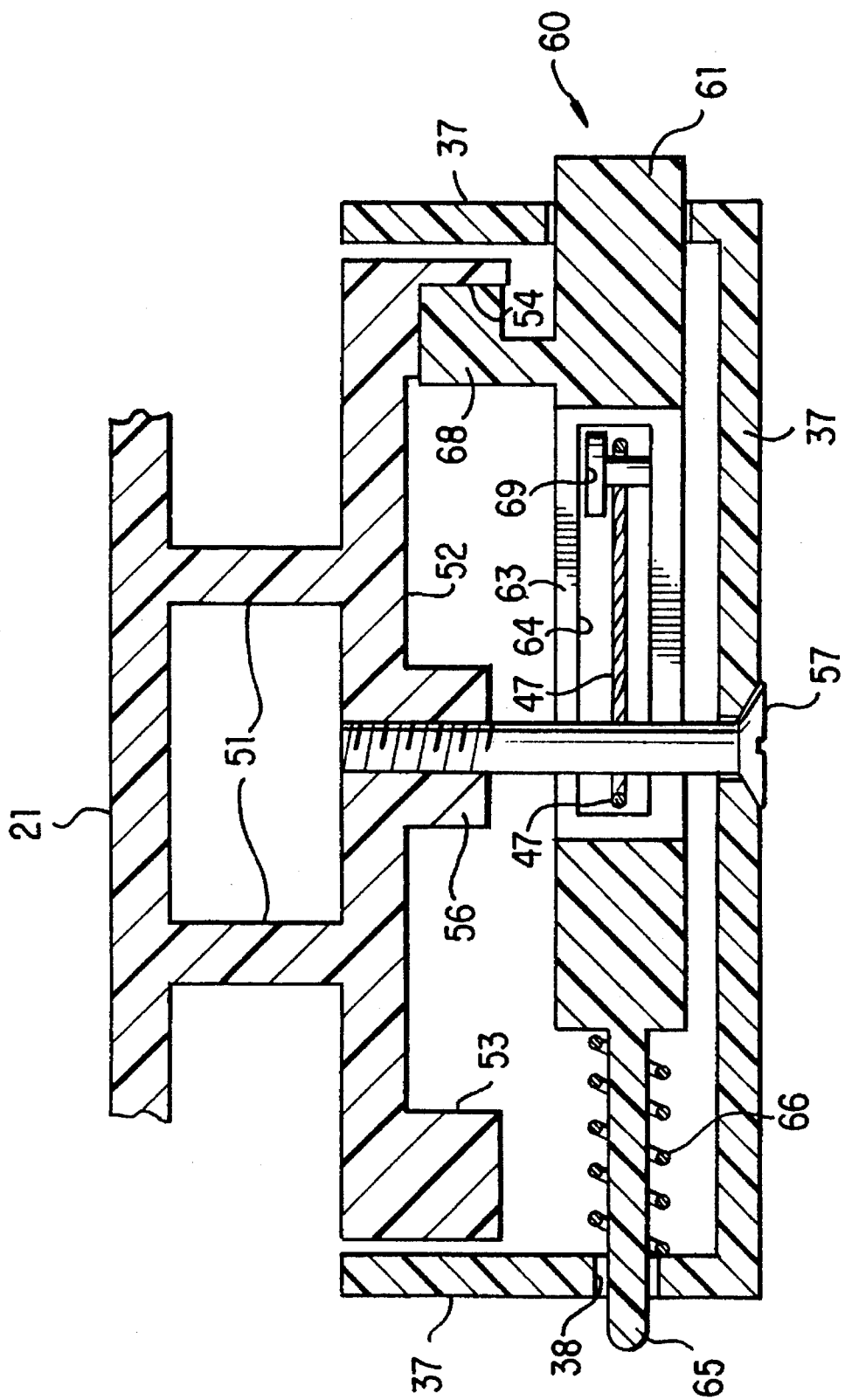
FIG. 8 is a sectional view of a slidable key, a handle hub, a handle positioning cup, and a small portion of a side of the infant carrier shell, taken in the direction of the arrows 8—8 in FIG. 7.

As shown in FIGS. 6, 7, and 8, positioning cups 50 comprise hub supports 51 on shell sides 21, circular hub faces 52, circular sides 53, four hub slots 54 within sides 53, pivot shafts 56, and pivot screws 57. Proceeding counter-clockwise from the numbered slot 54 of cup 50 in FIG. 6, the four slots 54 are used for: (1) manually carrying the infant car seat, (2) placing a baby in the infant car seat or removing a baby therefrom, (3) providing an additional cushion between the front dashboard of an automobile or the back of a front seat thereof, and (4) slightly elevating the head end of the infant car seat to facilitate feeding of the infant and the like.

As shown in FIGS. 6, 7, and 8, slidable key assemblies 60 comprise slidable keys 61 on each side of shell 20, slots 63 within keys 61 for pivot shafts 57, slots 64 within keys 61 for wires 47, positioning rods 65 at ends of slides 60 that are inserted into orifices 38, positioning springs 66 that surround rods 65, stop pegs 68 that are attached to slides 61 for positioning within slots 54, and terminal connections 69 for wires 47 which are attached to key 61. Keys 61 slide back-and-forth in movement 62 as stop peg 68 is selectively disengaged from one slot 54 and positioned in another after handle grip 31 has been selectively moved from one position to another in arcuate movement 36.

Figure 2:
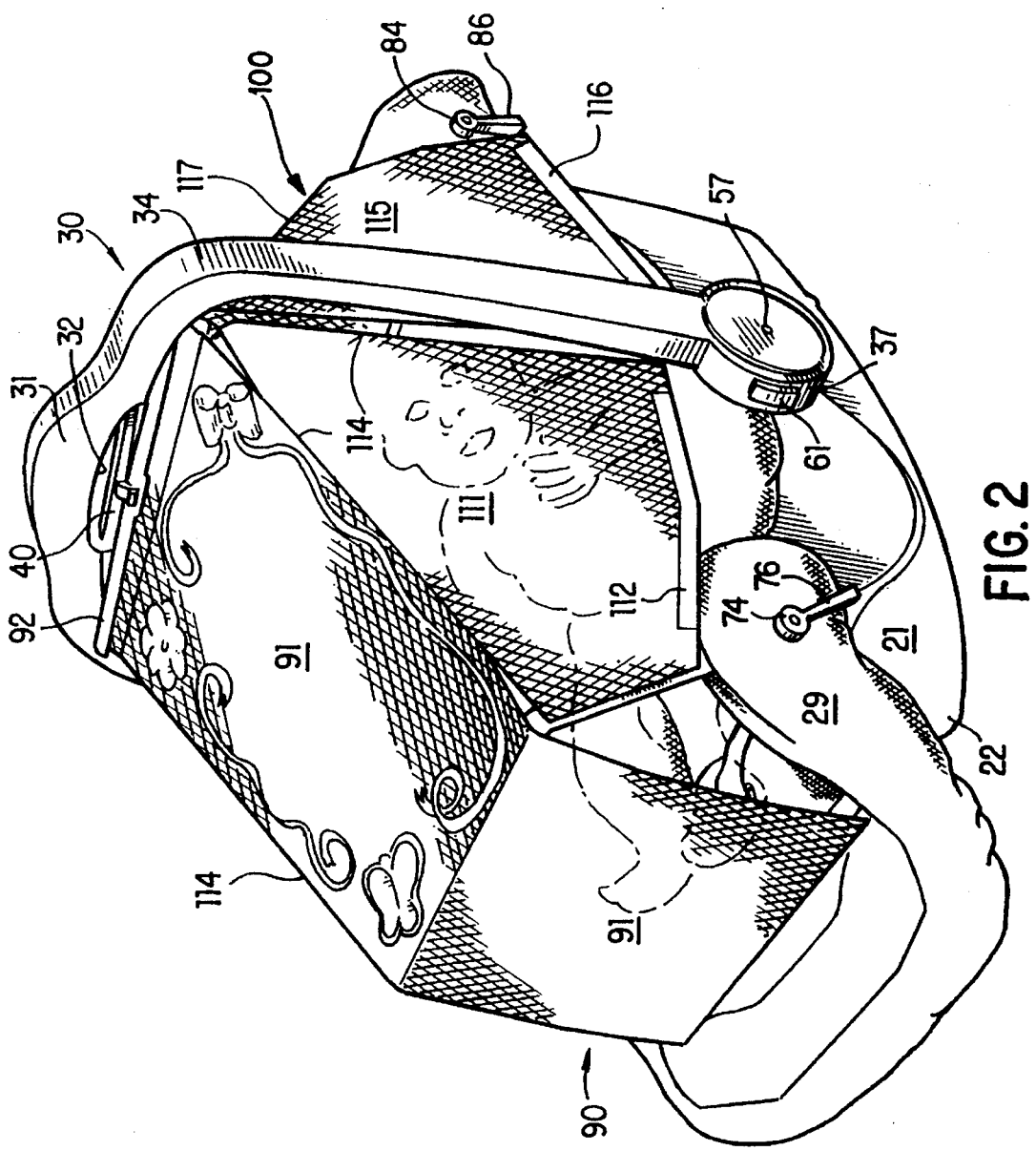
FIG. 2 is an isometric view of the infant car seat with both sunvisors in their respective protective positions.
Figure 4:
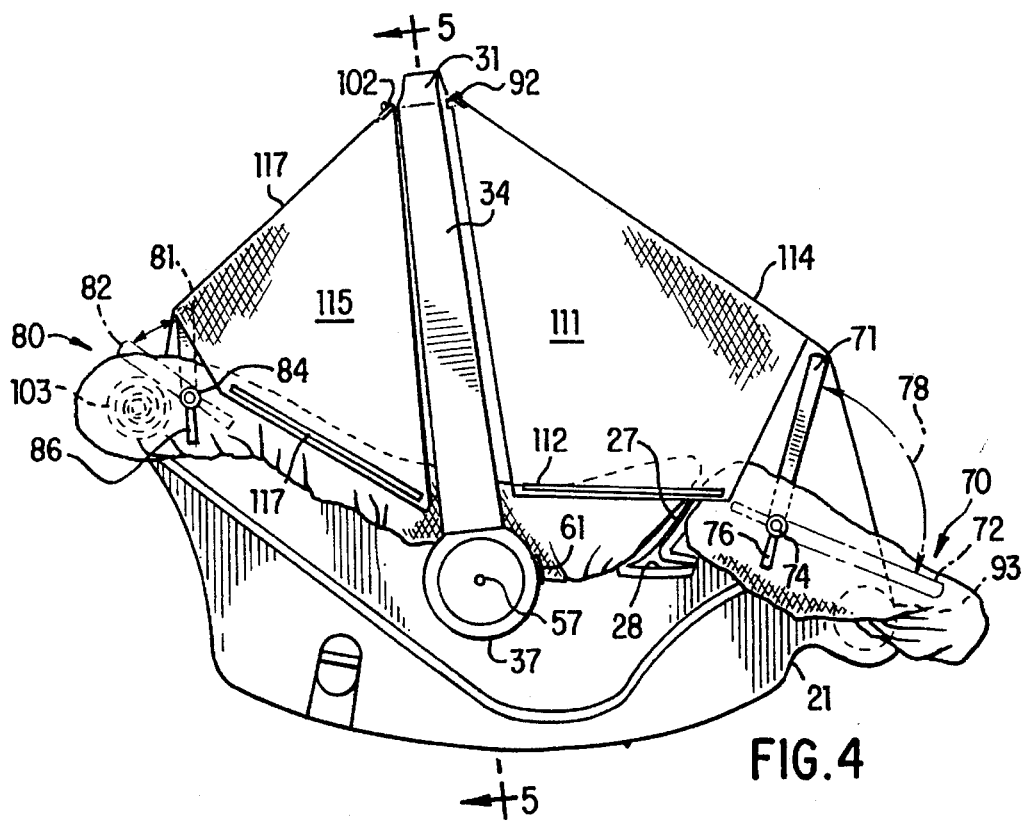
FIG. 4 is a side view of an elevation assembly for the infant car seat, with both sunvisors and both pairs of sideflaps in position.

As shown in FIGS. 1, 2, and 4, sunvisor elevation assembly 70 at foot end 22 of shell 20 comprises a support bar in raised position 71 or in lowered position 72, support bar shaft 74, and support bar levers 76 at each end of the support bar. Each bar lever 76 is rigidly attached to support bar shaft 74 which is axially and rigidly attached to the support bar. As one or both levers 76 are manually operated, the support bar revolves along arcuate path 78.

As shown in FIGS. 1, 2, and 4, sunvisor elevation assembly 80 at head end 23 of shell 20 comprises a support bar in raised position 81 or in lowered position 82, support bar shaft 84, and support bar levers 86. Bar levers 86 are rigidly attached to support bar shafts 84 in the same manner as for assembly 70. As one of both levers 86 are manually operated, the support bar revolves along arcuate path 88.

Figure 3:
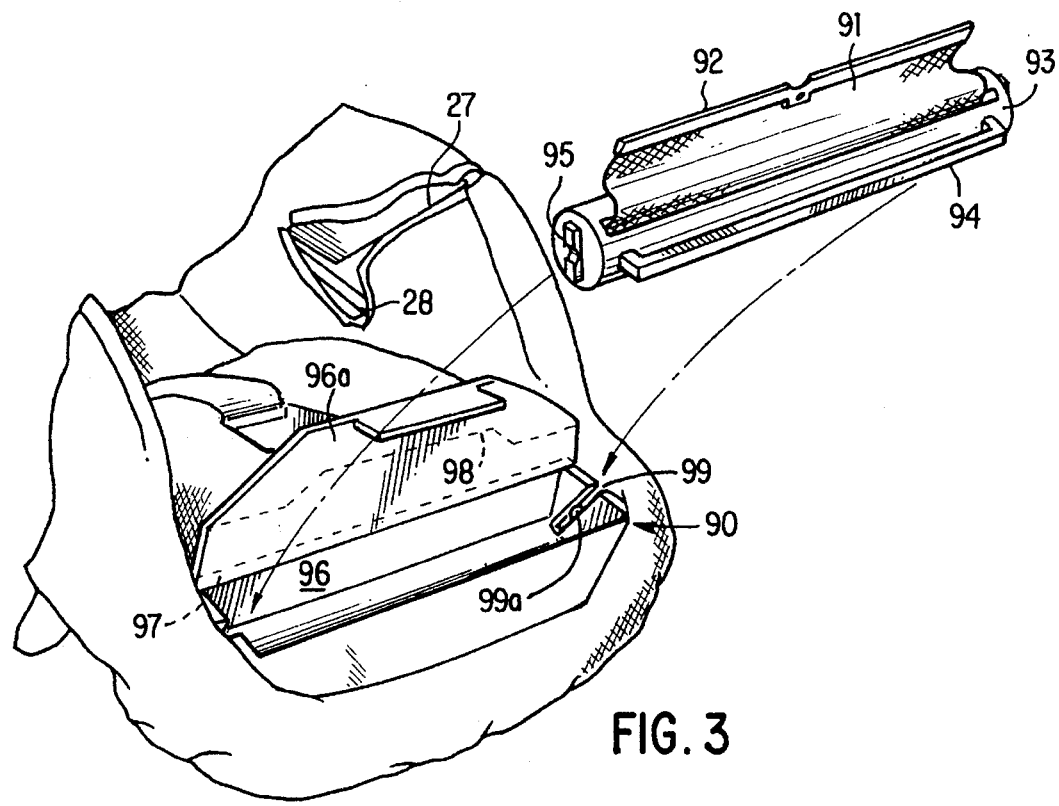
FIG. 3 is an isometric view of the front portion of the infant car seat with the door of the cartridge compartment open and the front visor storage cartridge about to be positioned therewithin.

As shown in FIGS. 1, 2, 3, 4, 5, 9, and 11A, foot sunvisor assembly 90 comprises foot sunvisor 91, tension edge 92 of foot sunvisor 91, storage cartridge 93 for foot sunvisor 91, cartridge handle 94 for cartridge 93, release ridge 95 at each end of cartridge 93, compartment 96 for storing cartridge 93 as shown in FIG. 3, door 96a of compartment 96, slot 97 in compartment 96 for feeding foot sunvisor 91 therethrough, recess 98 in door 96a for storing tension edge 92, slot 99 in each end of compartment 96, and release button 99a in each slot 99 for retaining cartridge 93.

As shown in FIGS. 1, 4, and 10, head sunvisor assembly 100 comprises head sunvisor 101, tension edge 102, storage cartridge 103, cartridge handle 104, release ridge 105 at each end of cartridge 103, a compartment for storing cartridge 103 which has door 106a, slot 107 for feeding head sunvisor 101 therethrough, a slot in each end of the compartment for retaining cartridge 103, and recess 108 in door 106a for storing tension edge 102.

Tension edges 92, 102 are pulled away from cartridges 93, 103 and over their support bars toward handled assembly 30 in its upright or manual carrying position to engage attachment hooks 49 on each side of female slide member 41, as shown in FIG. 2.

As shown in FIGS. 2, 4, 9, 9A, 10, 11A, and 11B, sideflap assemblies 110 comprise foldable foot sideflaps which are identified as 111 in closed or operative position and 113 in folded or inoperative position, Velcro® fasteners 112 for foot sideflaps 111, hinges 114 to attach foot sideflaps 111 to foot sunvisor 91, foldable head sideflaps which are identified as 115 in closed or operative position and 119 in folded or inoperative position, Velcro® fasteners 116 for head sideflaps 115, hinges 117 for head sideflaps 116, flexible hinge pins 118 within both hinges 114 and 117, and hinge loops 118a for hinges 114, 117. Velcro® strips 112, 116 are selectively attached to interacting Velcro® strips on sides 21 that are not visible in the drawings.

Figure 11B:
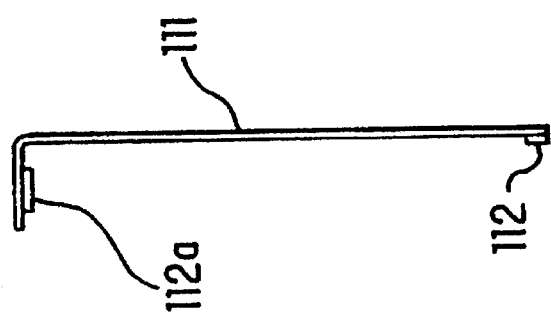
FIG. 11B is a side view of this sideflap of FIG. 11A that includes upper and lower Velcro® strips.
Figure 11A:
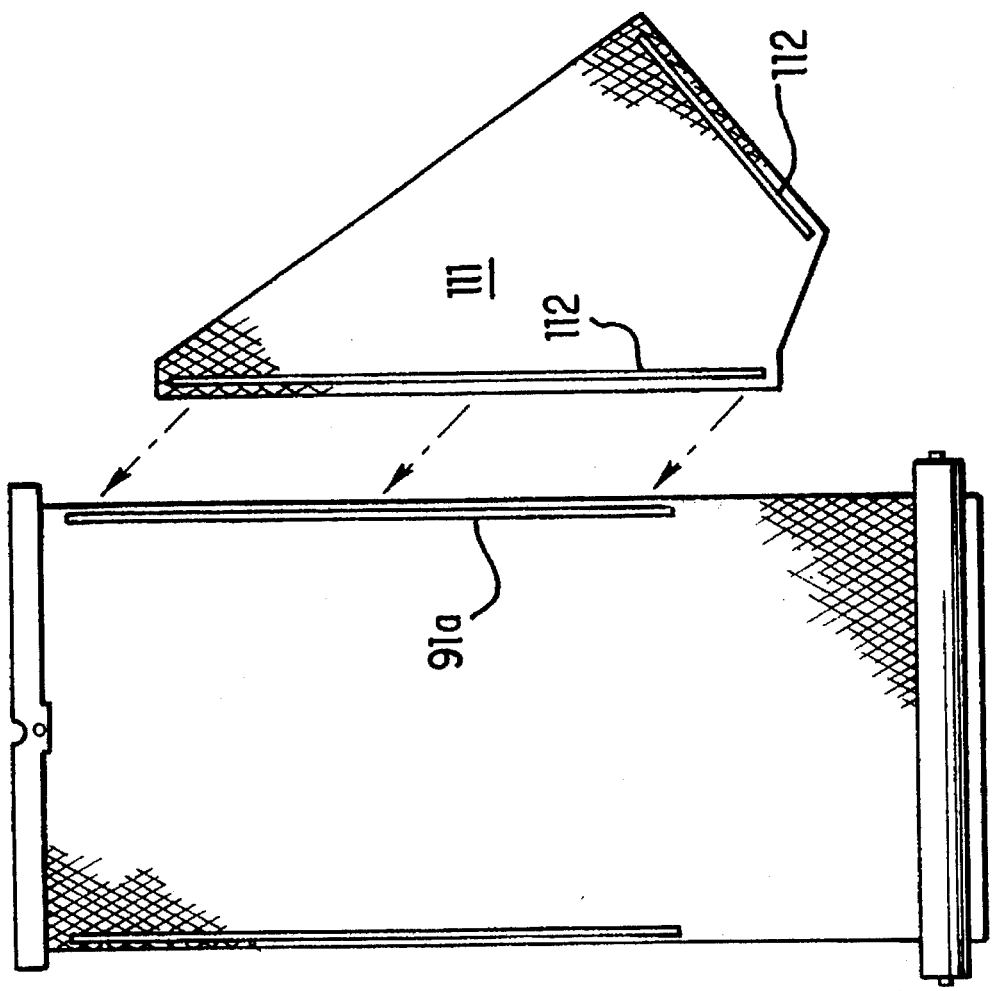
FIG. 11A relates to the detached sideflap embodiment and is a front view of the foot sunvisor cartridge, the foot sunvisor, and a foot sideflap, having a Velcro® strip along its upper edge, that is about to be attached to a Velcro® strip on the foot sunvisor.

The detachable embodiment is shown in FIGS. 11A and 11B. It differs from the foldable embodiment in that each foot sideflap 111 has Velcro® strip 112a along its upper edge which is selectively attached to Velcro® strip 91a along a side edge of foot sunvisor 91 while lower strip 112 is attached to an interacting Velcro® strip which is attached to a side 21 of infant carrier shell 20. Each detachable head sideflap is attached to head sunvisor 101 and a side 21 and detached therefrom in the same manner.

Because it will be readily apparent to those skilled in the infant car seat art that innumerable variations, modifications, applications, and extensions of the principles hereinbefore set forth can be made without departing from the spirit and the scope of the invention, what is hereby defined as such scope and is desired to be protected should be measured, and the invention should be limited, only by the following claims.

What is claimed is:

1. An infant car seat which comprises:

A) an integrally molded infant carrier shell, comprising a bottom, a foot end, a head end, a pair of cartridge compartments, and a pair of sides;

B) a handle assembly which is movably attached to said shell;

C) a pair of sunvisor assemblies, comprising a foot sunvisor, a head sunvisor, and a pair of storage cartridges, each said sunvisor having a tension edge, a pair of side edges, and a cartridge edge, each said sunvisor being attached to and stored within one of said cartridges and each said cartridge being stored within one of said cartridge compartments; and D) a pair of sunvisor elevation assemblies which are disposed at said foot end and at said head end to raise said foot sunvisor and said head sunvisor above the feet and head of an infant occupant of said infant car seat.

2. The infant car seat of claim 1, wherein each said cartridge comprises opposed ends, a cartridge handle therebetween, and a release ridge at each said opposed end.

3. The infant car seat of claim 2, wherein each of said pair of compartments comprises:

A) an elongated storage space, having ends, within which one of said cartridges fits;

B) a hinged door, having a recess therein for storing one of said tension edges, which selectively covers said storage space;

C) a feed slot, disposed adjacent to said door, for feeding one of said sunvisors therethrough; and D) a retaining means at each said end of said storage space for holding one of said cartridges.

4. The infant car seat of claim 3, wherein each said retaining means comprises a retaining slot and a release button therewithin, said release button cooperatively operating with one of said release ridges.

5. The infant car seat of claim 1, wherein each of said pair of sunvisor elevation assemblies comprises:
   A) a U-shaped support bar;
   B) a support bar shaft having ends which are rigidly attached to said bar; and
   C) a pair of bar levers, each being rigidly attached to said shaft at said ends thereof, whereby said support bar revolves along an arcuate path from a lowered position to a raised position as one or both of said levers are manually operated.

6. The infant car seat of claim 1, wherein said handle assembly comprises:
   A) an elongated handle member which is disposed in parallel to said bottom, said handle member having opposed ends;
   B) a pair of side members, each being rigidly attached at one end to one of said opposed ends of said handle member; and
   C) a pair of hub positioning assemblies, each being rigidly attached to the other end of one of said side members and rotatably attached to one said side of said shell.

7. The infant car seat of claim 6, wherein each said hub positioning assembly comprises:
   A) a circular hub which is rigidly attached to said other end of one of said side members, said hub having a positioning orifice, a pair of support plates, and a key opening;
   B) an elongated key which is slideably disposed in each said hub between said pair of support plates and is aligned with said positioning orifice and with said key opening, each said key having a longitudinally and laterally aligned shaft slot, a longitudinally and vertically aligned wire slot, a rigidly attached stop peg, an axially aligned and rigidly attached positioning rod at one end of said key, a positioning spring surrounding said rod, and a rigidly attached terminal connection for one of said flexible wires, said positioning rod being operably disposed within said positioning orifice and said key being operably disposed so that the other end thereof protrudes through said key opening and is available for pushing with a finger to move said stop peg towards the center line of said carrier shell; and
   C) a pair of cups, each being rigidly attached to a side of said carrier shell and having a plurality of peg slots in the outer edge thereof and a rigidly attached shaft in the center thereof, one of said hubs being coaxially aligned with and surrounding one of said cups and said stop peg being selectively positionable within one of said peg slots.

8. The infant car seat of claim 7, wherein said handle pivoting assembly additionally comprises a handle grip release assembly which comprises a female slide member, a male slide member, a compression spring within said female slide member, squeeze surfaces on said female and male members, wire connections attached to said female and male slide members, and flexible wires which are attached to said wire connections and slideably disposed within said side members, both said female slide member and said male slide member being slideably attached to said handle and disposed parallel thereto and spaced therefrom.

9. The infant car seat of claim 8, wherein each of said flexible wires is attached to one said terminal connection, whereby pressing said squeeze surfaces moves both said keys inwardly and removes each said stop peg from one said hub slot so that said handle may be pivoted to a selected position.

10. An infant car seat which comprises:
    A) an integrally molded infant carrier shell, comprising a bottom, a foot end, a head end, a pair of cartridge compartments, and a pair of sides;
    B) a handle assembly which is movably attached to said shell and comprises an elongated handle grip and a handle grip release assembly which is slideably attached thereto;
    C) a pair of sunvisor assemblies, comprising a foot sunvisor, a head sunvisor, and a pair of storage cartridges, each said sunvisor having a tension edge, a pair of side edges, and a cartridge edge, each said sunvisor being attached to and stored within one of said cartridges and each said cartridge being stored within one of said cartridge compartments; and
    D) a pair of sunvisor elevation assemblies which are disposed at said foot end and at said head end to raise said foot sunvisor and said head sunvisor above the feet and head of an infant occupant of said infant car seat.

11. The infant car seat of claim 10, wherein each said cartridge comprises opposed ends, a cartridge handle therebetween, and a release ridge at each said opposed end.

12. The infant car seat of claim 11, wherein each of said pair of compartments comprises:
    A) an elongated storage space, having ends, within which one of said cartridges fits;
    B) a hinged door, having a recess therein for storing one of said tension edges, which selectively covers said storage space;
    C) a feed slot, disposed adjacent to said door, for feeding one of said sunvisors therethrough; and
    D) a retaining means at each said end of said storage space for holding one of said cartridges.

13. The infant car seat of claim 12, wherein each said retaining means comprises a retaining slot and a release button therewithin, said release button cooperatively operating with one of said release ridges.

14. The infant car seat of claim 10, wherein each of said pair of sunvisor elevation assemblies comprises:
    A) a U-shaped support bar;
    B) a support bar shaft having ends which are rigidly attached to said bar; and
    C) a pair of bar levers, each being rigidly attached to said shaft at said ends thereof, whereby said support bar revolves along an arcuate path from a lowered position to a raised position as one or both of said levers are manually operated.

15. The infant car seat of claim 10, wherein said pair of sunvisor assemblies additionally comprises a pair of foot sideflaps and a pair of head sideflaps.

16. The infant car seat of claim 15, wherein said pair of foot sideflaps are hingedly attached to said foot sunvisor on each side thereof and to said sides of said shell.

17. The infant car seat of claim 16, wherein said pair of head sideflaps are hingedly attached to said head sunvisor on each side thereof and to said sides of said shell.

18. The infant car seat of claim 10, wherein said handle grip release assembly comprises a rigidly attached pair of attachment hooks, on opposed sides thereof, to which said foot sunvisor and said head sunvisor are selectively attached.

19. An infant car seat which comprises:

A) an integrally molded infant carrier shell, comprising a bottom, a foot end, a head end, a pair of cartridge compartments, and a pair of sides; and B) a handle assembly which is movably attached to said shell, comprising:
 1) an elongated handle member which is disposed in parallel to said bottom, said handle member having opposed ends,
 2) a pair of side members, each being rigidly attached at one end to one of said opposed ends, and
 3) a pair of handle pivoting assemblies, each being rigidly attached to the other end of one of said side members and rotatably attached to one said side of said shell, and
 4) a handle grip release assembly which is slideably attached to said handle member.

20. The infant car seat of claim 19, wherein said pair of handle pivoting assemblies is a pair of hub positioning assemblies which comprise:

A) a pair of circular hubs, each being rigidly attached to said other ends of one of said side members, each hub having a positioning orifice, a pair of support plates, and a key opening;

B) an elongated key which is slideably disposed in each said hub between said pair of support plates and is aligned with said positioning orifice and with said key opening, each said key having a longitudinally and laterally aligned shaft slot, a longitudinally and vertically aligned wire slot, a rigidly attached stop peg, an axially aligned and rigidly attached positioning rod at one end of said key, a positioning spring surrounding said rod, and a rigidly attached terminal connection for one of said flexible wires, said positioning rod being operably disposed within said positioning orifice and said key being operably disposed so that the other end thereof protrudes through said key opening and is available for pushing with a finger to move said stop peg towards the center of said carrier shell; and C) a pair of cups, each being rigidly attached to a side of said carrier shell and having a plurality of hub slots in the outer edge thereof and a rigidly attached shaft in the center thereof, each of said hubs being coaxially aligned with and surrounding one of said cups and said stop peg being selectively positionable within one of said peg slots.

21. The infant car seat of claim 20, wherein said handle pivoting assembly additionally comprises a handle grip release assembly which comprises a female slide member, a male slide member, a compression spring within said female slide member, squeeze surfaces on said female and male members, wire connections attached to said female and male slide members, and flexible wires which are attached to said wire connections and slideably disposed within said slide members, both said female slide member and said male slide member being slideably attached to said handle and disposed parallel thereto and spaced therefrom.

22. The infant car seat of claim 21, wherein each of said flexible wires is attached to one said wire connection, whereby pressing said squeeze surfaces moves both said keys inwardly and removes each said stop peg from one said hub slot so that said handle assembly may be pivoted to a selected position.

* * * * *